United States Patent [19]
Colley et al.

[11] Patent Number: 5,251,268
[45] Date of Patent: Oct. 5, 1993

[54] INTEGRATED METHOD AND APPARATUS FOR CHARACTER AND SYMBOL RECOGNITION

[75] Inventors: Robert W. Colley, Menlo Park, Calif.; Parvathy Bhaskaran, Mesa, Ariz.; Alan Filipski; Robert Flandrena, both of Tempe, Ariz.; Tad Krolik, Phoenix, Ariz.; Mark Janney, Tempe, Ariz.; Steven Ruggiero, Chandler, Ariz.

[73] Assignee: Electric Power Research Institute, Inc., Palo Alto, Calif.

[21] Appl. No.: 743,504

[22] Filed: Aug. 9, 1991

[51] Int. Cl.⁵ .............................................. C06K 9/62
[52] U.S. Cl. ...................................... 382/14; 382/15; 382/38; 395/23; 395/53; 395/54
[58] Field of Search ................... 382/14, 15, 41, 49, 382/38; 395/21, 20, 23, 53, 54

[56] References Cited

U.S. PATENT DOCUMENTS

| | | | |
|---|---|---|---|
| 4,589,142 | 5/1986 | Bednar | 382/38 |
| 4,748,675 | 5/1988 | Suzuki et al. | 382/14 |
| 4,802,230 | 1/1989 | Horowitz | 382/17 |
| 4,876,731 | 10/1989 | Loris et al. | 382/15 |
| 4,941,122 | 7/1990 | Weideman | 382/15 |
| 4,949,388 | 8/1990 | Bhaskaran | 382/14 |
| 4,975,975 | 12/1990 | Filipski | 382/14 |
| 5,077,807 | 12/1991 | Bokser | 382/14 |
| 5,086,479 | 2/1992 | Takenaga | 382/14 |

OTHER PUBLICATIONS

Bhaskaran, Parvathy et al; "The Use of Artificial Intelligence Techniques in Drawing Management," Society of Manufacturing Engineers; MS89-693; 1989.

Filipski, Alan; "Recognition of Hand-lettered Characters in the GTX 5000 Drawing Processor," IEEE; Apr. 1989.

Colley, Robert W. et al; "An Entity-Relationship Model for Nuclear Power Plants," ANS Topical Meeting on Computer Applications for Nuclear Power Plant Operation and Control; pp. 765-769.

Vlontzos, J. A.; "A Hierarchical System for Character Recognition With Stochastic Knowledge Representation," 1988 IEEE International Conference on Neural Networks, 1-601-616.

Khotanzad, A. and Lu, J. H.; "Distortion Invariant Character Recognition by a Multi-Layer Perceptron and Back-Propagation Learning," 1988 IEEE International Conference on Neural Networks, 1-601-616.

*Primary Examiner*—Joseph Mancuso
*Attorney, Agent, or Firm*—Flehr, Hohbach, Test, Albritton & Herbert

[57] ABSTRACT

An apparatus and method for recognizing written items including characters and symbols is disclosed. A scanner is utilized for scanning the characters and symbols. A recognition module is used to confidently identify the scanned characters and symbols. The recognition module includes a mechanism for recognizing characters. This mechanism includes a character recognition rule base which yields identified characters and unidentified characters. The unidentified characters are conveyed to neural networks for recognition. The recognition module also includes a mechanism for recognizing symbols. This mechanism includes a symbol recognition rule base which yields identified symbols and unidentified symbols. The unidentified symbols are conveyed to neural networks for recognition. The recognition module also includes a mechanism for context processing of the characters and symbols. The context processor utilizes a multilevel blackboard with a number of ascending levels. The blackboard combines characters and symbols into logical units. The blackboard also serves to verify the identity of the characters and symbols. The resultant data from the recognition module is placed in a metafile which is conveyed to a modification module. The modification module includes graphics editing software to edit the scanned characters and symbols. After editing, a translator is used to convert the scanned characters and symbols to a format suitable for a CAD system or data base.

37 Claims, 16 Drawing Sheets

| R1  | R2  | R3  | R4  | R5  |
|-----|-----|-----|-----|-----|
| R6  | R7  | R8  | R9  | R10 |
| R11 | R12 | R13 | R14 | R15 |
| R16 | R17 | R18 | R19 | R20 |
| R21 | R22 | R23 | R24 | R25 |

FIG. 5B

| | PASS 1 |
|---|---|
| GEOMETRY 102 |  |
| POLYGON 104 |  |
| ARROW 106 | |
| TEXT 108 | TO LETDOWN 302-660 (A-1) COOLERS T F<br>2 1/2", 2 1/2" 2" RC-V6C RC-V7C PX 402 T<br>REACTOR DRAIN PUMP PT-6 302-690 SH.1,(C-4) |
| V-GEOM 110 | |
| COMPOSITE 112 | |
| CONNECTOR 114 |  |
| ASSOC. 116 | |
| META-SYMBOL (COMPLEX) 118 | |

FIG. 10

| | PASS 2 |
|---|---|
| GEOMETRY *102* | |
| POLYGON *104* | |
| ARROW *106* | ↗  ↓  |  ─── |
| TEXT *108* | TO LETDOWN   302-660 (A-1)   COOLERS   T     F<br>2 1/2"   2 1/2"   2"   RC-V6C   RC-V7C   PX      402     T<br>REACTOR DRAIN PUMP     PT-6   302-690     SH.1,(C-4)<br>▽  ⬠  ◇  ⬠  ○  ⬠ |
| V-GEOM *110* | |
| COMPOSITE *112* | ⧖  ⧖ |
| CONNECTOR *114* | ──  ─  ─  \|  ─── |
| ASSOC. *116* | |
| META-SYMBOL (COMPLEX) *118* | |

FIG. 11

| | PASS 3 |
|---|---|
| 102 GEOMETRY | |
| POLYGON 104 | |
| ARROW 106 | |
| TEXT 108 | TO LETDOWN  302-660 (A-1)  COOLERS  T    F<br>2 1/2"  2 1/2"  2"  RC-V6C  RC-V7C  PX    402    T<br>REACTOR DRAIN PUMP  PT-6  302-690  SH.1,(C-4) |
| V-GEOM 110 | |
| COMPOSITE 112 | |
| CONNECTOR 114 | |
| ASSOC. 116 | |
| META-SYMBOL (COMPLEX) 118 | |

FIG. 12

| | PASS 4 |
|---|---|
| GEOMETRY | |
| POLYGON 104 | |
| ARROW 106 | |
| TEXT 108 | |
| V-GEOM 110 | TO LETDOWN 302-660 (A-1) COOLERS T F<br>2 1/2" 2 1/2" 2" RC-V6C RC-V7C PX 402 T<br>REACTOR DRAIN PUMP PT-6 302-690 SH.1,(C-4) |
| COMPOSITE 112 | |
| CONNECTOR 114 | |
| ASSOC. 116 | |
| META-SYMBOL (COMPLEX) 118 | |

FIG. 13

| | PASS 5 |
|---|---|
| GEOMETRY | |
| POLYGON 104 | |
| ARROW 106 | |
| TEXT–108 | |
| V-GEOM 110 | |
| COMPOSITE 112 | (shapes) |
| CONNECTOR 114 | (lines) |
| ASSOC. 116 | ? ↓ TO LETDOWN 302-660 (A-1) COOLERS T F<br>2 1/2" 2 1/2" 2" RC-V6C RC-V7C PX 402 T<br>REACTOR DRAIN PUMP PT-6 302-690 SH.1,(C-4) |
| META-SYMBOL (COMPLEX) 118 | |

| | PASS 6 |
|---|---|
| GEOMETRY | |
| POLYGON 104 | |
| ARROW 106 | |
| TEXT 108 | |
| V-GEOM 110 | |
| COMPOSITE 112 | |
| CONNECTOR 114 |  |
| ASSOC. 116 | 2 1/2" ↓  TO LETDOWN  302-660 (A-1)  COOLERS  T  F<br>2 1/2"  2"  RC-V6C  RC-V7C  PX  402  T<br>REACTOR DRAIN PUMP  PT-6  302-690  SH.1,(C-4) |
| META-SYMBOL (COMPLEX) 118 | |

INTEGRATED METHOD AND APPARATUS FOR CHARACTER AND SYMBOL RECOGNITION

BRIEF DESCRIPTION OF THE INVENTION

This invention relates to an apparatus and method for recognizing characters and symbols. More particularly, this invention relates to an apparatus and method which utilizes a number of artificial intelligence techniques, including neural networks, to recognize characters and symbols to extract the information they represent.

BACKGROUND OF THE INVENTION

Optical character recognition techniques have been somewhat successful in recognizing printed text in standard typeset fonts. If the printed data is in fact recognized, it may be converted to an electronic format, in which case it may be rapidly retrieved, distributed, and manipulated.

Recognizing hand-drawn characters is much more difficult than recognizing standard printed data. Recognition of symbols, such as those used in engineering drawings, is even more difficult. While the present invention focuses on the particularly difficult problem of character and symbol recognition in engineering drawings, the method and apparatus may also be successfully applied to less rigorous problems.

It is estimated that there are over three billion engineering drawings in the United States and Canada, and that over 25 million new engineering drawings are produced each year. A number of problems exist in relation to these drawings. First, it is extremely expensive to file, copy, and prepare them. In addition, the drawings are commonly misplaced or otherwise missing. Another problem relates to the fact that in many instances multiple copies of a drawing exist. As a result, efforts must be made to insure that a single master copy contains all modifications. Modifying existing drawings is an expensive and time-consuming process which commonly introduces errors.

The nuclear power industry provides a specific example of the magnitude and importance of the drawing management problem. A large nuclear power plant may have several hundred thousand D (24" by 36") and E (36" by 48") sized drawings which depict piping, instrumentation, electrical connections, and other information describing the plant and its subsystems.

Regulations from the Federal Nuclear Regulatory Commission require that the plant operators have rapid access to the information on these drawings. Safety considerations require that plant drawings be readily accessible. In addition, during maintenance and retrofit projects, access to the drawings is vital.

Currently, it takes several hours to locate and copy a particular drawing. Moreover, it can take several days to retrieve a particular drawing and transport it to a given field location. Even if one obtains a desired drawing, the drawing may reference other drawings, in which case the time consuming cycle of obtaining a drawing is repeated. In sum, the cost of information gathering may be a substantial portion of the total project cost.

To avoid these problems, efforts have been made to convert engineering drawings to an electronic format. If the engineering drawings could be placed in an electronic format, a number of benefits would result. For instance, the cost of revising the drawings would decrease. The time needed to modify a drawing on a Computer Aided Drafting (CAD) system is typically a fraction of the time need to accomplish the same revision using paper and pencil techniques. Another benefit is that CAD drawings have increased accuracy.

Currently, CAD drawings are not susceptible to qualitative and quantitative modeling. Thus, stress analyses and safety analyses are not easily performed in conjunction with CAD drawings.

With an integrated database, equipment drawings may be linked to pictorial databases to provide a clear facsimile of equipment. This would be especially advantageous if the equipment was otherwise difficult to view because it was remotely located or located in a harsh environment.

Electronic storage of the drawings would result in improved control and access of the drawings. If the drawings are in an electronic format, electronic transmission and distribution may be exploited.

These benefits are not presently available because it is very difficult to convert engineering drawings into useful electronic format. One approach to converting drawings into an electronic format is to manually enter drawings into a CAD system. Naturally, this is time-consuming, error-prone, and expensive. Another approach is to initially scan the drawing and then have a draftsman trace the figure on a CAD workstation. However, present scanning techniques fail to identify characters and symbols or actually misidentify them. In the first case, the characters and symbols must be subsequently identified by an individual. In the latter case, the misidentification could lead to subsequent problems. Thus, there are a number of problems associated with the scanning technique. Consequently, the scanned image is not particularly advantageous since it is still time consuming to edit and revise the resultant document.

Present character and symbol recognition techniques for interpreting scanned images rely upon artificial intelligence (AI) methods. While each separate method has been somewhat successful, these methods still fail to recognize a substantial percentage of the characters and symbols they process. As a result, a large amount of time is required to complete the electronic figure and to eliminate the errors introduced during the scanning process. Consequently, the effectiveness of utilizing one AI technique alone is marginal.

A relatively new AI technology, neural networks, has displayed a capability for recognizing hand-drawn characters. Neural networks utilized in an image processing capacity are disclosed in U.S. Pat. Nos. 4,941,122 and 4,876,731, these patents are expressly incorporated by reference herein.

Neural networks emulate the ability of the human brain to identify patterns by simulating the operation of human nerve cells, called neurons. Artificial neural systems are networks of interconnected processing elements, or neurons. Each neuron can have multiple input signals, but generates only one output signal.

Neural networks typically include a number of layers. The first layer receives the input data and conveys it as input to the next layer. Each layer includes a group of neurons operating in parallel on the input signals fed to the layer. The neurons in each group of neurons in a layer act as feature detectors.

The feature detector function is realized through multiplying the input signal by a plurality of weight factors. The product is then summed by a summing network which applies its output through a function to generate the output of the neuron. The function of each neuron is therefore dependent upon the input applied to the neuron and the neuron's associated weighing.

The weighing of a neuron may be calculated so as to render the neuron sensitive to lines in a horizontal direction of an image. In contrast, the weighing may be such that the neuron is sensitive to lines in a vertical direction. In any case, a layer may have many groups of neurons which are processing different characteristics in parallel. This neuron behavior is generally governed by first-order ordinary differential equations in the output signal variable.

By adjusting the weighing associated with the neurons, the network can become adaptive. That is, by readjusting the neurons in such a way that they generate a desired output for a given input, they can be used to provide an identifying output signal based upon the unknown input signal they receive. Thus, different patterns may be recognized by adapting the neural network to perform different logic functions and thereby respond to significant features which characterize a given pattern.

In order to make neural networks a feasible tool in recognition of items in hand-written drawings, a number of constraints must be overcome. The training of the neural networks should be obtained with relatively few samples of each written item. The neural network should be capable of detecting subtle differences between written items. The neural network should operate independently of other contextual information.

OBJECTS AND SUMMARY OF THE INVENTION

Thus it is a general object of the present invention to provide a method and apparatus for confidently extracting and interpreting information graphically represented by symbols and text.

It is another object of the present invention to provide a method and apparatus with increased character and symbol recognition confidence.

It is a related object of the present invention to improve artificial intelligence character recognition confidence through hierarchical multilevel processing.

It is still another object of the present invention to provide neural networks which are trained using relatively few samples.

It is another object of the present invention to provide neural networks which operate independently of contextual information.

It is another object of the present invention to provide neural networks which detect subtle differences between characters and symbols.

It is another object of the present invention to provide a method of recognizing characters or symbols that are touching other characters or symbols using segmentation techniques, raster editing techniques, and an appropriately trained neural network.

It is yet another object of the present invention to associate text strings to their corresponding symbol so that the attributes of the symbol can be used to populate an electronic database.

It is still another object of the present invention to provide a method for identifying the connectivity of symbols.

It is another object of the present invention to provide a method of combining groups of symbols and text to form logical units corresponding to the object represented by the symbol.

It is a related object of the present invention to provide verification of the information recognized by utilizing previously formed logical units.

It is another object of the present invention to provide a method and apparatus which enables conversion of engineering drawings into a useful electronic format.

These and other objects are obtained by an apparatus and method for recognizing written items including characters and symbols. A scanner is utilized for scanning the characters and symbols. A recognition module is used to confidently identify the scanned characters and symbols. The recognition module includes a mechanism for recognizing characters. This mechanism includes a character recognition rule base which yields identified characters and unidentified characters. The unidentified characters are conveyed to neural networks for recognition. The recognition module also includes a mechanism for recognizing symbols. This mechanism includes a symbol recognition rule base which yields identified symbols and unidentified symbols. The unidentified symbols are conveyed to neural networks for recognition. The recognition module also includes a mechanism for context processing of the characters and symbols. The context processor utilizes a blackboard with a number of ascending levels. The blackboard combines characters and symbols into logical units. The blackboard also serves to verify the identity of the characters and symbols. The resultant data from the recognition module is placed in a metafile which is conveyed to a modification module. The modification module includes graphics editing software to edit the scanned characters and symbols. After editing, a translator is used to convert the scanned characters and symbols to a format suitable for a CAD system or data base.

BRIEF DESCRIPTION OF THE DRAWINGS

For a better understanding of the nature and objects of the invention, reference should be had to the following detailed description taken in conjunction with the accompanying drawings, in which:

FIGS. 5A-5B respectively represent a convolution mask in accordance with the present invention and a grid with multiple regions in which the convolution mask is discretely applied.

FIG. 10 depicts the blackboard of the present invention and the processing of elements during a second pass.

FIG. 11 depicts the blackboard of the present invention and the processing of elements during a third pass.

FIG. 12 depicts the blackboard of the present invention and the processing of elements during a fourth pass.

FIG. 13 depicts the blackboard of the present invention and the processing of elements during a fifth pass.

Like reference numerals refer to corresponding parts throughout the drawings.

DETAILED DESCRIPTION OF THE INVENTION

Figure 1:
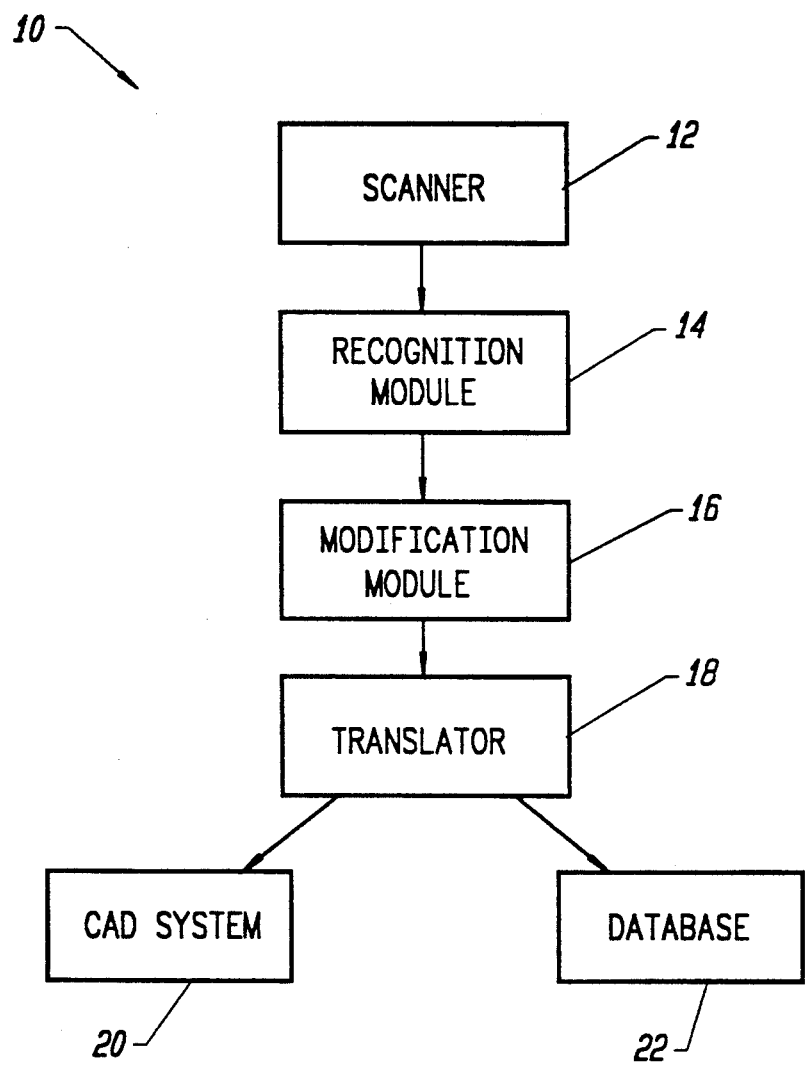
FIG. 1 is a block diagram depicting the major components of the present invention.

Turning to FIG. 1, a character recognition apparatus 10 in accordance with the present invention is depicted. By way of overview, the present invention includes a scanner 12 which scans a document which is to be converted to an electronic format. The output from the scanner 12, in the form of raster, or pixel, data is conveyed to a recognition module 14. The recognition module identifies characters and symbols and places them into a metafile. The metafile is conveyed to the modification module 16 where an individual may refine the data. The cleaned metafile from the modification module 16 is then conveyed to a translator 18. The translator 18 converts the metafile into a format suitable for a CAD system 20 and/or a database 22. More particularly, the translator 18 produces two types of information. A simple representation of the drawing geometry is loaded into a CAD system 20. Thus, this data describes the drawing's appearance. The other type of information is a description of the drawing components and their characteristics which is loaded into a data base 22.

The hardware associated with each of these elements may be as follows. A digital scanning device (CCD or laser) is preferably employed. The scanner 12 should be of the type which is suitable for reading images from paper, mylar documents (typically D or E sized), or microfiche aperture cards. Scan resolutions of 200 to 2000 dots per inch may be chosen, with 400 DPI being a typical value. The output of the scanner is a binary encoding of the raster image of the drawing.

The recognition module 14 preferably contains eight Motorola 68020 microprocessors, 64 Mb of RAM memory, hardware scan filters, scanner interface logic, and a communication port to the modification module 16. The GTX 5000, a commercially available recognition module sold by GTX Corporation, Phoenix, Arizona is a device which may be used in accordance with the present invention. As to be more fully described herein, the recognition module 14 receives the raster image from the scanner 12. The recognition module stores a number of programs. These programs are executed on the incoming raster image data. As a result, the recognition module 14 recognizes characters and symbols. The identified characters and symbols, and other data, are stored in a metafile which is conveyed to the modification module 16.

The modification module 16 may be a resident program in a standard PC workstation. A standard IBM PC/AT or compatible with sufficient memory and display capabilities to carry out the editing, display and control functions may be used. Since the drawing and recognition process are rarely perfect, a drafting clerk uses known graphics editing software on the workstation to clean up and verify the scanned information. The modification module 16 preferably supports manual editing, clean up, and verification of the metafile produced by the recognition software. Appropriate graphics editing tools are known in the art.

The translator 18 may also be a resident program in a standard PC workstation. The translator 18 converts the metafile into a format compatible with the target CAD system 20 and the data base 22. Translators are known in the art.

Having provided an overview of suitable hardware components to be used in accordance with the present invention, attention turns to the details associated with the various programs which run in accordance with the hardware.

Figure 2:
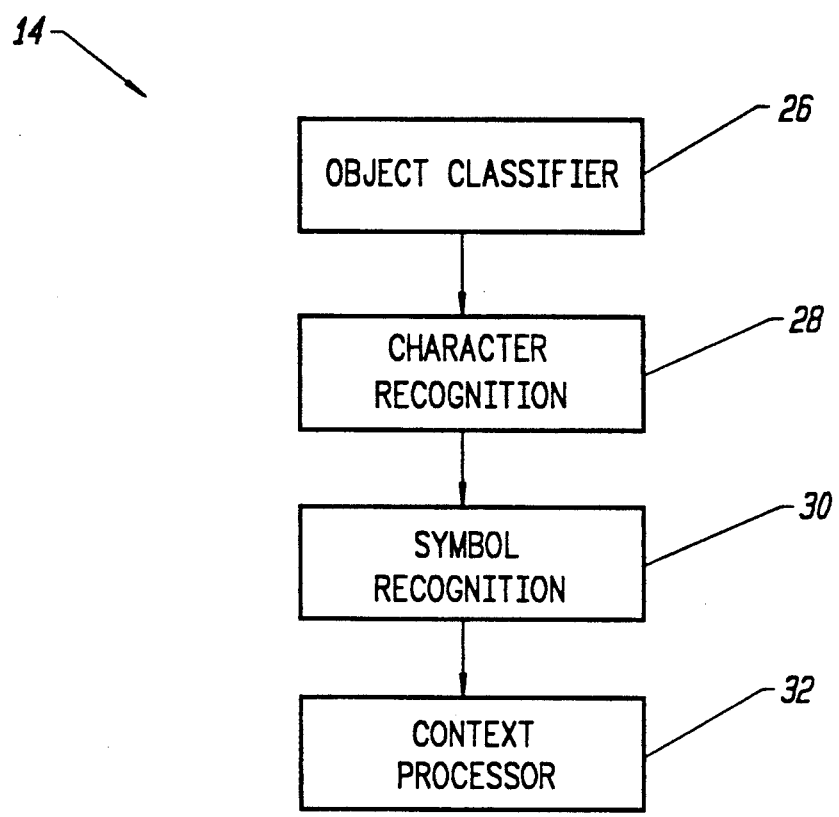
FIG. 2 is a block diagram depicting the major components of the recognition module of the present invention.

Turning to FIG. 2, the major components of the recognition module 14 are provided. The recognition module 14 includes an object classifier 26 which receives the raster data from the scanner 12. The object classifier 26 separates the data into data for character recognition and symbol recognition. As used herein, characters refer to alpha/numeric representations. Symbols, as used herein, refer to graphic representations of objects such as pumps, valves, gates, etc.. Further, in this disclosure, the term item refers to characters and/or symbols.

The object classifier 26 conveys the appropriate data to either the character recognition module 28 or the symbol recognition module 30. While most characters and symbols will be confidently identified by the character recognition module 28 and the symbol recognition module 30, the final confidence with which the characters and symbols are recognized is assigned through the context processor 32. The context processor 32 utilizes the context of the data to further refine the recognition process and to provide relational information regarding the various drawing elements. This brief overview of the recognition module the elements within the recognition module 14.

The object classifier 26 receives raster data from the scanner 12. The original raster image in the raster data is broken up by the object classifier 26 into collections of adjacent pixels, called raster objects. The raster objects are identified as either characters or symbols. For instance, objects smaller than some threshold, usually set to about 0.4 inch, are initially assumed to be characters while larger objects are assumed to be symbols. Object classifiers are known in the art.

Figure 3:
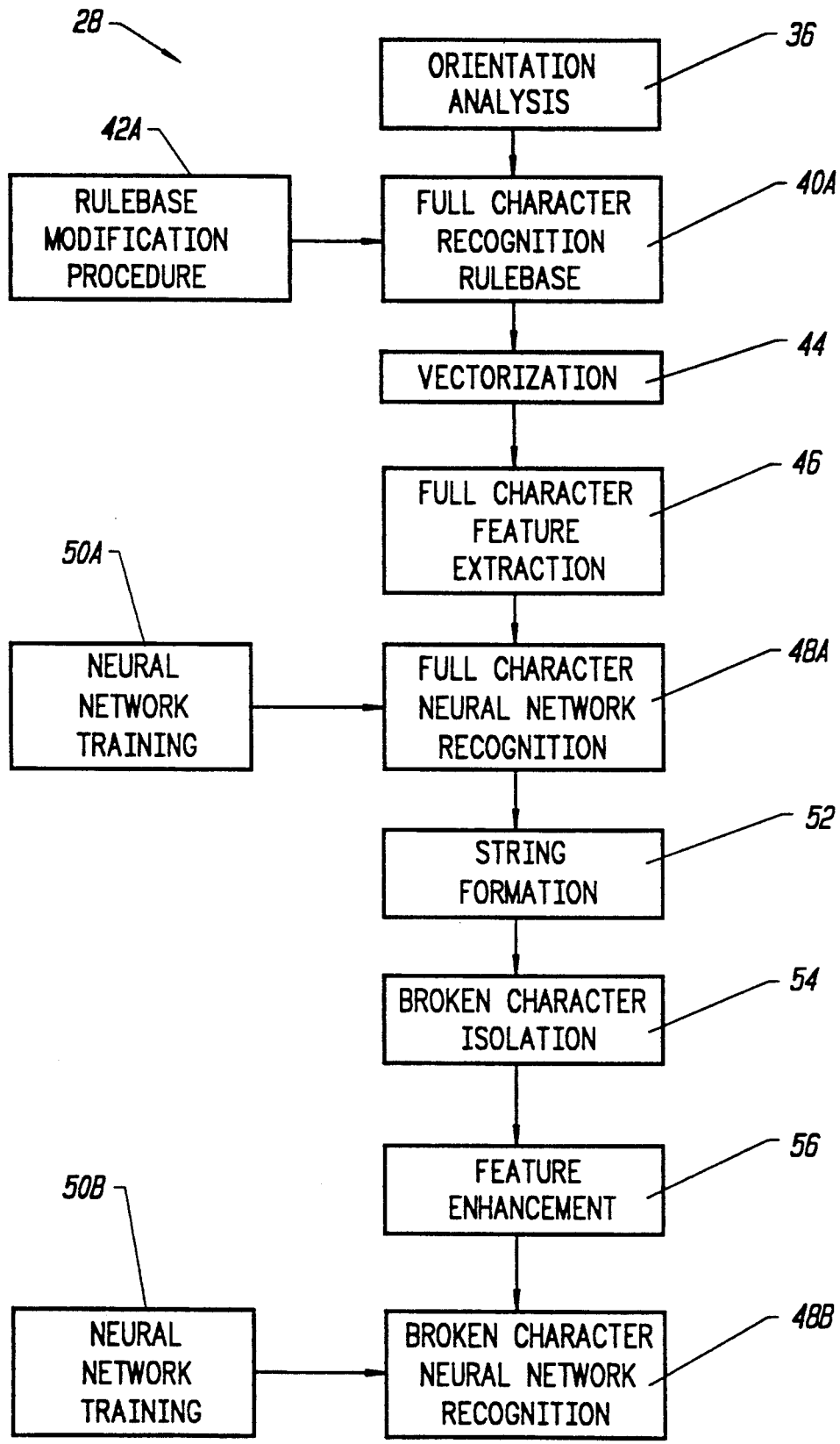
FIG. 3 is a block diagram depicting the character recognition method of the recognition module.

Raster objects corresponding to characters are conveyed to the character recognition module 28, which is more fully disclosed in relation to FIG. 3. By way of overview, character recognition module 28 includes an orientation analysis step 36. After orientation analysis, a rulebase character recognition module 40A is invoked to identify fully formed characters. Fully formed characters are non-broken (continuous letters, without gaps) and non-touching (not connected to other elements). Those characters which are not recognized through rulebase recognition module 40A are conveyed to a vectorization module (block 44). After vectorization, features are extracted from the vectorized character (block 46). The extracted features are conveyed to a neural network recognition module (block 48A). Subsequently, individual characters are combined to form text strings (block 52). If required, broken characters and characters touching other elements are isolated (block 54). These characters are processed such that identifying features are enhanced (block 56). The extracted entities are conveyed to broken character neural network recognition module (block 48B).

The rulebase recognition module 40A is subject to a rulebase modification procedure 42A. The neural network recognition module 48A is established through a neural network training procedure 50A. Similarly, the neural network recognition module 48B is established through a neural network training procedure 50B. The details associated with the character recognition module 28 will now be disclosed.

The preliminary step within the character recognition module 28 is orientation analysis 36. Orientation analysis 36 begins by assuming that all the characters in a cluster of raster data have the same orientation. As used herein, a cluster refers to an arbitrarily sized accumulation of character objects, where the character objects are within a threshold distance of one another. An attempt is made to recognize all of the orientation-independent characters within a cluster. These are characters that may be recognized without knowing their orientation, such as "A", "F", "K". From this information and from heuristics involving the shape of the cluster, the orientation of the cluster is determined.

Preferably, orientation analyses are performed concurrently on multiple clusters. The orientation is preferably expressed as an angle quantized into one of 24 (15 degree increments) possible directions. The orientation finder computes a 24 element vector, whose components represent the estimated probability that the cluster is oriented in the corresponding direction. The final orientation is taken as the component having the greatest likelihood.

Once the orientation of a cluster is established, the final identification of all the characters within it is performed. Preferably, three techniques are employed: rulebase character recognition 40A, full character neural network recognition 48A, and broken character neural network broken recognition 48B.

Since full character rulebase character recognition 40A requires less computation than character recognition through the neural networks, it is employed first. Neural network character recognition 48 is utilized when rulebase character recognition 40A cannot identify a character with a predefined confidence level.

The character recognition module 28, like the symbol recognition module 30, uses an artificial intelligence technique known as an expert system. This approach simulates the reasoning ability of a human expert to solve a problem by applying a series of rules to a situation and attempting to infer a solution. As is known in the art, these rules are stored in a file called a rulebase.

Rulebase character recognition 40A is based on a set of "features" extracted from the characters. Typical features include the distribution of the character's pixels within a bounding rectangle or circle, coefficients of a 2-D fourier transform of the character, orientations, and relative sizes of the strokes making up the character. Methods of analyzing these features are known in the art.

Preferably, decision trees are used to guide the classification process in a way that minimizes the number of features which are examined to arrive at an identification. As the traversal of the tree is performed, a confidence is computed which provides an estimate of the correctness of the final classification.

Handwritten characters deviating too far from their ideal form are misclassified by the decision trees. However, such misclassifications have low associated confidences. In this case, the neural network character recognition module 40 is used to resolve the situation. The particular neural network employed is trained to distinguish between characters commonly confused at the given point in the decision tree.

The present invention preferably utilizes a set of binary trees and associates with each non-terminal node of each tree the following information: (1) the set of classes possible at the node; (2) the feature to be used at the node; (3) a cutpoint value within the range of the above feature; (4) pointers to both child nodes. The cutpoint is compared to the unknown's feature value to determine which child node the unknown should be sent to. The set of possible classes at a node is determined by the node's parent; the set of classes associated with the root node is the set of all character classes. At each node it is therefore required to determine the feature to be used and its cutpoint. This technique is fully disclosed in U.S. Pat. No. 4,975,975, by Filipski, which is expressly incorporated by reference herein. The rulebase character recognition module 40A of the present invention departs from the technique disclosed in Filipski in that the orientation independent features are isolated and placed at the top of the binary trees.

Preferably, five binary decision trees are built, using only a single feature at each node. This feature is selected automatically using heuristics that account for both the balance of the tree and the separation of the two clusters of child classes. A different heuristic is used for each of the five trees so that they will, insofar as possible, identify different features.

The final decision about a character is obtained by taking a weighted vote among the five trees. Each alternative has an associated confidence, computed as a function of two factors. The first factor is the number of trees that agree on a certain classification. The more trees that agree, the higher the confidence. The second factor is the distance between the measured feature values of the unknown and the cutpoint at each node along the classification path through the tree. The greater the distances, the higher the confidence.

Since neural network character recognition is used as a backup to the character recognition rulebase 40A, it is necessary to utilize the confidence factor to determine when to invoke the neural network character recognition. If there is a high confidence that the rulebase character recognition 40A is correct, there is no reason to use the supplementary neural network character recognition 48.

In accordance with the invention, a rulebase modification procedure 42A is utilized. This procedure is only required when new symbols must be recognized, or when the recognition of known symbols must be improved. Rulebases are written and debugged using a multi-step process. In the initial stage, a user writes the rules in the LISP-like rulebase language and uses an editor to produce idealized examples of objects satisfying the rules. Then, on a workstation, using a debugging tool such as SLICK (Symbolic Language Interface for Creating Knowledge), the user debugs the rules on the idealized symbols. In general, algorithms rely on inexact (fuzzy) logic to accommodate the usually noisy data. These techniques are fully disclosed in U.S. Pat. No. 4,949,388, issued to Bhaskaran. This patent is expressly incorporated by reference herein.

The neural network character recognition module 44A for full characters is used as an adjunct to character recognition module 40A. As discussed, if the decision trees fail to converge to a classification with a high enough confidence, the low confidence samples are passed to a neural network trained to make the appropriate distinction.

Thus, the neural networks of the present invention may be conceptually viewed as residing at the leaf nodes of the decision trees. Each neural network is trained to resolve a particular ambiguity that is likely to occur at an associated node. For instance, the leaf node that represents a "5" or "S" classification would have a pointer to a neural network which was trained to distinguish the two characters.

In preparation of conveying the character information to the full character neural network recognition module 48A, preferably, two steps are taken: vectorization (block 44) and full character feature extraction (block 46). While the prior art methods rely upon feeding raw raster image to a network, with the present invention, preferably certain features from the character image are supplied to the network, as will be disclosed in relation to the feature extraction step (block 46). This approach reduces both the size of the network and the amount of training effort required for success.

The features are selected based upon a vector representation of the character. Vectorization (block 44) attempts to describe characters as collections of line segments, circles, circular arcs, and possibly other kinds of entities such as elliptical arcs, or splines. Tables describe the connectivity of the vectors. The resulting representation is usually much more compact than the representation of the raster image, but some information is discarded, such as small irregularities in the boundaries of the inferred entities.

Vectorization 44 is important for several reasons. First, a few vectors can adequately represent the large amount of information present in the raw digitized data. This represents a reduction in computational expense. Next, vectors are easily normalized for subsequent feature extraction. In addition, proper vectorization smooths noise while leaving meaningful distinctions intact. In short, analysis of vectors provides additional perspective on character samples, allowing an increase in the recognition rate and a decrease in the number of false positives.

A linear segmentation of the character border is preferably utilized. This is accomplished by tracking and attempting to approximate successive portions of the border of the character with a linear vector. When the difference between the border of the character and the approximating line increases above a certain threshold, the current vector is terminated and a new vector begun. The new vector's initial point coincides with the previous vector's endpoint. After the entire boundary of the character has been approximated with linear vectors, a filter is used over the linear segmented boundary to remove noise. A suitable vectorization method is disclosed in U.S. Pat. No. 4,817,187.

After vectorization (block 44), a feature extraction step (block 46) is preferably invoked. The feature extraction step (block 46) includes the step of normalizing the vectorized character to be fed to the neural network. Preferably, the normalized sample is divided into nine regions and five features are extracted from each region. Five similar features are also extracted from the figure as a whole, giving a total of 50 features. An input vector, composed of the 50 feature values, is then presented to a neural network for classification.

In accordance with a preferable embodiment of the full character feature extraction step (block 46), the following feature set is utilized. There are 10 groups with 5 features in each group. The first group of features is extracted from global measurements of the character, while the remaining 9 groups of features describe the 9 regions resulting from a uniform 3 by 3 subdivision of the normalized character grid. Five suitable global features include:

(1) The total "slantiness" of the character. For instance, this statistic can be 0 if all vectors are horizontal or vertical, or may have a maximum value if all vectors are at 45 degrees.

(2) The mean slope of the character. This may be determined by calculating the arc tangent of the quotient of the total y-differences of all vectors divided by the total x-differences.

(3) A statistic measuring the total angles of all vertices along the boundary of the character; that is the total angle of all line segments composing the character.

(4) The x-coordinate of the centroid of the end-points of all vectors making up the boundary of the character.

(5) The y-coordinate of the centroid of the end-points of all vectors making up the boundary of the character.

Five suitable features for the region include:

(1) The total "slantiness" of the region, as defined above.

(2) The number of boundary vectors that intersect the region.

(3) The mean slope within the region, as defined above.

(4) The total boundary length within the region.

(5) The sum of all the angles of the elements within the region.

Thus, preferably, these features are extracted from the character data and fed to the full character neural network recognition module (block 48A). Utilization of this feature extraction method results in better recognition than that obtained when the character itself is fed to the neural network. Other features may also be successfully extracted, in accordance with this technique.

Attention now turns to the neural networks utilized in accordance with the present invention. Many parameters are associated with defining neural networks. These parameters include the number of hidden nodes, the number of hidden layers, magnitude of the learning coefficient, magnitude of the momentum factor, and number of training samples.

Preferably, fully-connected feed-forward neural networks are used. A feed-forward neural network consists of three or more layers of processing units: one input layer, one or more hidden layers, and one output layer.

A network with one hidden layer comprised of five to ten nodes is a useful classifier. Using fewer nodes seems to prolong training, while using more nodes seems to produce degraded performance on the testing samples. Presumably, this is because with too many degrees of freedom, the network starts to memorize the particular input samples, instead of being forced to generalize.

A learning coefficient of 0.7 and a momentum factor of 0.9 may be used. The following logistic activation function may be employed:

$$f(x) = (p2-p3)/(1+e^{(-p1 \times x)}) + p3$$

with p1=1, p2=1, and p3=0.

Neural network training 50A is an off line procedure. It is only required when the system is adapted to a new class of drawings, or tuning is required to improve the recognition rate of certain characters.

The training operator gathers samples of misrecognized characters from one or more metafiles produced by previous conversions. For each sample, the training operator must provide the correct character identification. These samples are converted into training files. The training files are fed to the neural network and the network's output is compared to the true class. If the output is incorrect, the connections between processing units are adjusted in order to achieve convergence to the actual class designation. This process is performed until all of the training samples have been classified correctly. This technique is described in "Parallel Distributed Processing" by Rumelhart and McClelland (The MIT Press, 1986).

After the network has converged, testing samples are presented to the network. The number of the correct classifications reflects the generalization ability of the network. The feed forward phase of this algorithm may use either a software or hardware implementation of the network depending on performance considerations. Results are preferably double checked using at least two independent network simulators. Suitable neural network simulators which may be used in accordance with the present invention are OWL, NEUROSOFT, and BRAINMAKER. NEUROSOFT is a commercially available product sold by HNC, Inc., San Diego, Calif. OWL is a commercially available product sold by Olmsted and Watkins, Escondido, Calif. Simulations may be run on a Sun 3/50 workstation running Unix.

Current literature and statistical theory indicate that a large number of training samples are required for effective generalization. Despite these teachings, the present invention provides a very clean class separation while using a relatively small training set. This is achieved by utilizing the full character feature extraction module (block 46), as previously described.

Preferably, the number of training samples is approximately twenty. Below this number, the network's generalization capability varies with the particular samples provided to the network for training, as well as with the random initial interconnection values. As the training samples approach twenty, variability of the network's generalization capabilities disappear.

Preferably, one neural network is provided for each decision tree character class which has experienced errors in the form of characters being incorrectly assigned to that class. This factorization of the problem results in faster training and execution of the networks. The staged procedure is advantageous since it allows the use of many small neural networks instead of one huge one.

It must be emphasized that the process of training the neural networks recreates them from scratch; therefore to refine their performance to recognize a new character, the training set must include all of the samples used in previous training sessions, as well as those representing the new character.

The training process produces equivalent but not identical networks. That is, two networks created from the same training set may not have identical sets of coefficients, although they will both correctly classify all the samples in the training set, and will tend to agree in the majority of their other classifications. Therefore, preferably, both the training files and network coefficient files are under some form of version control, so that previous incarnations can be recovered if a training session produces undesirable side effects.

Once all characters within a cluster have been identified, a string formation module 52 groups the characters into individual lines of text called strings. The string formation module 52 also recognizes multipart punctuation, such as colons and semicolons which cannot be identified until surrounding context is considered. String formation utilizes context processing which will be further discussed below.

Figure 4A:
FIGS. 4A-4C represent various broken and touching characters which are identified in accordance with the present invention.

After string formation (block 52), broken characters are isolated (block 54). The broken characters include partially formed, non-continuous characters. Examples of full and broken characters are depicted in reference to FIGS. 4A–4C. Particularly, in reference to FIG. 4A, a fully formed "T" is shown on the left while a broken "T" is shown on the right. The "T" is broken because the horizontal portion of the letter does not touch the vertical portion of the letter. Prior art techniques are employed to isolate the broken characters.

Figure 4B:
Figure 4C:
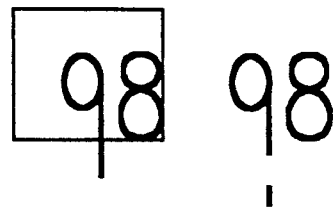

Broken character isolation (block 54) also involves identifying characters which are touching other elements. If a character is recognized as touching another element, prior art techniques are used to separate the characters. For instance, in FIG. 4B, the "AB" combination is initially touching. By utilizing prior art techniques, the two characters may be separated. However, the separated characters may still include portions of the previously connected character. Thus, as seen in FIG. 4B, a portion of the "B" is now a part of the "A", while a portion of the "B" has been truncated. An analogous problem results when a number is touching a line, and the line is later removed (through the use of prior art techniques). This problem is demonstrated in relation to FIG. 4C. The resultant numeral includes a broken "9" and an "8" which is squared-off because of its previous proximity to the box. In any of the foregoing examples, the result is a broken character which must be interpreted.

In accordance with the present invention, the broken characters are recognized through feature enhancement (block 56). Feature enhancement (block 56) involves a combination of scaled rastering and utilization of regionalized convolution masks. Scaled rastering is known in the art. However, scaled rastering has not be combined with convolution masks to provide feature enhancement. Moreover, the convolution masks utilized in the present invention are unique.

Scaled rastering involves dividing a character or symbol into a number of regions. The average value of the ON pixels in the region is then measured. The resultant value is preferably normalized to be in the range 0–1. As is known in the art, this value provides identifying information about the character or symbol. Different sized grids may be used depending upon the desired resolution of the raster features. For example, a 7×8 grid may be used for an to A–Z character set, while a 9×11 grid may be used to distinguish (5,S) or (8,B) character problems.

Feature enhancement (block 56) utilizes a novel regional convolution masking method. Each broken character to be recognized is preferably divided into 25 regions using a 5×5 grid. Under prior art approaches, a convolution mask would be applied to the entire grid. In addition, with prior art approaches, the character is normalized, or scaled, prior to processing. This results in a thickening of the character when scaling up and thinning of the character when scaling down. In either case, the scaling of the original character affects the quality of the resultant character.

In contrast to these prior art approaches, with the present invention, scaling of the individual characters or symbols is not required. Desirable results may be obtained by utilizing regionalized convolution masking. Regionalized convolution masking employs a number of convolution masks. The convolution masks are applied to particular regions of a grid. The numbers constituting each mask are selected to highlight certain expected features of the given character. For example, the convolution mask of FIG. 5A would be applied to region "R1" of FIG. 5B to highlight the sharp corner of the number "5" to distinguish the number from the rounded corner of the letter "S".

Thus, expected features for a given character set are identified and appropriate convolution masks are created to enhance these expected features. For instance, for the A-Z character set or the 0-9 character set, masks are created to identify the expected unique features in these sets.

Figures 5A, 5B:
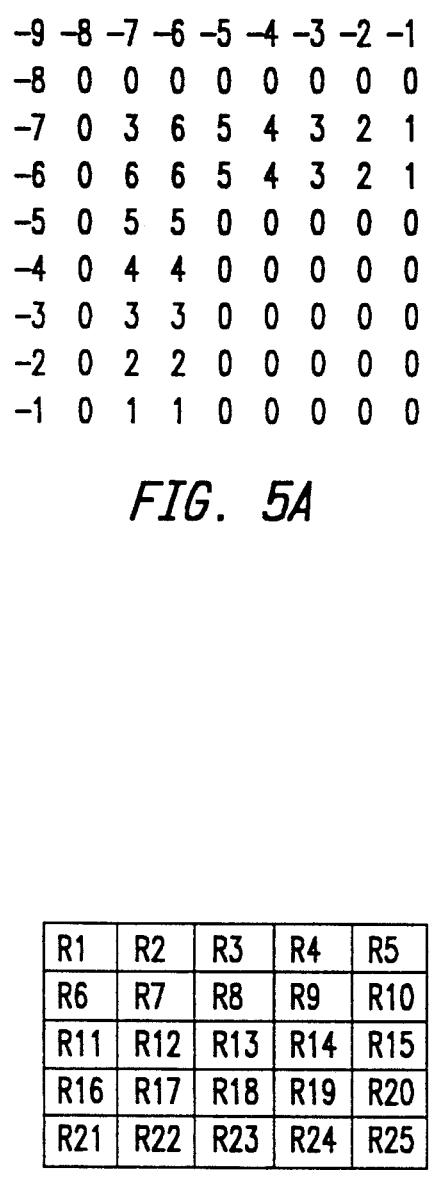

The regionalized convolution masking of the present invention is also unique in that a single mask may be moved through a number of regions. For instance, the convolution mask of FIG. 5A is helpful in identifying the sharp corner of the number "5". However, that corner may not actually be in region R1 of FIG. 5B. Therefore, in accordance with the invention, a roving feature is provided. This roving feature associates a roving value, or percentage of the critical area, over which the mask should move. That is, the mask of FIG. 5A may rove from region R1 through regions R2, R7, and R6. By moving the mask through a number of regions, the mask is more likely to enhance the proper portion of the character or the symbol. For example, by moving the mask of FIG. 5A through regions R1, R2, R7, and R8, there is a greater chance that the sharp corner of the number "5" will be enhanced. Therefore, the "5" will be easier to distinguish from an "S".

Thus, with the regionalized convolution method of the present invention, critical areas of characters or symbols are enhanced. In the same way, non-critical areas may be de-emphasized by the regionalized use of masks. Moreover, the regionalized convolution masking method of the present invention provides a scaling of the enhancing process, as opposed to a scaling of the actual character or figure. Therefore, the prior art problems associated with the scaling up or scaling down of a character are eliminated.

The resultant data from the feature enhancement step (block 56) is then fed to the broken character neural network recognition module (block 48B). Preferably, there are three groups of neural networks: (1) one group for the frequently confused broken characters "B", "8", "S", "5": (2) another group for letters A-Z; and (3) another group for numbers 0-9. As discussed, for each of these groups, a number of convolution masks may be used to enhance critical features.

Preferably, back propagation neural networks are implemented. The topology may be a fully connected network with one hidden layer and full connectivity from the input to the output layer. The size of the output layer is preferably determined by the number of characters in each group. Thus, group (1) would have 4 output layer nodes, while group (2) and (3) would have 26 and 10 output layer nodes respectively. The size of the input layer corresponds to the size of the feature set used. Thus, group (1) has an input layer with 4 nodes. As is known in the art, the input layer size determines the number of nodes in the hidden layer.

Figure 6:
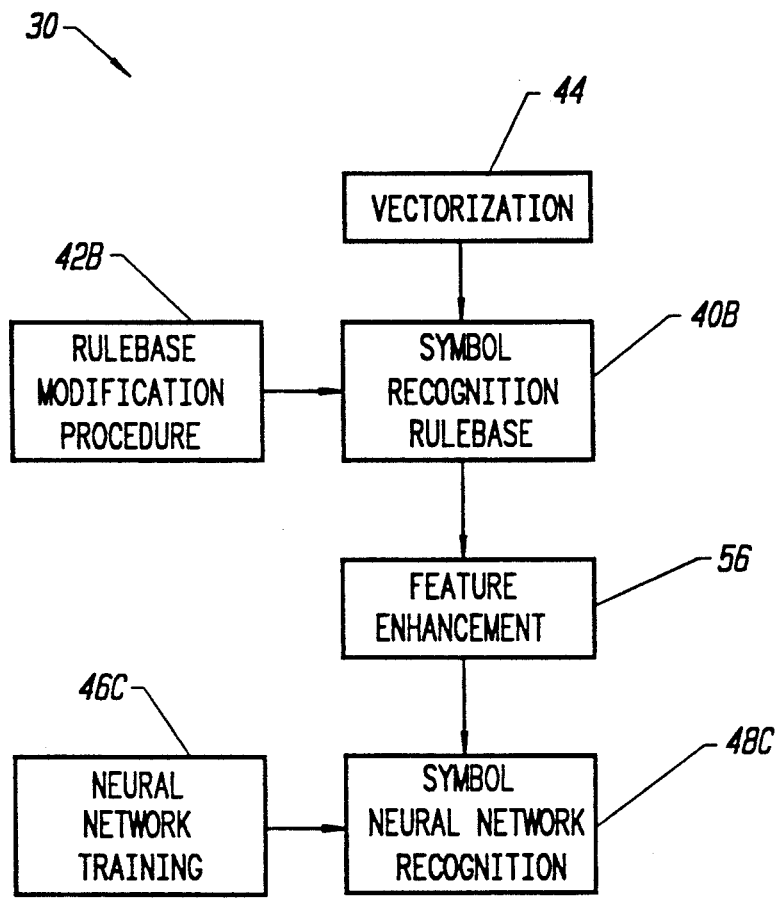
FIG. 6 is a block diagram depicting the symbol recognition method of the recognition module.

Turning now to FIG. 6, the symbol recognition module 30 is disclosed in block diagram form. The symbol recognition module 30 groups geometric objects based on proximity and identifies symbols composed of lines, arcs, and circles. When a symbol is recognized, the pieces comprising it are discarded and replaced by an "ideal" representation properly scaled and oriented. Symbols of this type, called simple symbols, cannot be combined with other simple symbols or text. Typically, symbols include: valves, pumps, instruments, switches, and fuses.

The first step associated with the symbol recognition module 30 is vectorization (block 44), as previously described. After vectorization (block 44), a symbol recognition rulebase 40B is invoked. Such rulebases are known in the art. U.S. Pat. No. 4,949,388 discloses an appropriate symbol recognition rulebase that may be used in accordance with the present invention. A rulebase modification procedure 42B is preferably provided to operate in accordance with the symbol recognition rulebase (block 40B).

Those symbols which are not identified by the symbol recognition rulebase (block 40B) are conveyed to the feature enhancement module (block 56), which has been previously described. The feature enhancement module (block 56), uses the techniques previously described to extract the relevant features of the symbol. The enhanced symbol is then conveyed to a symbol recognition neural network (block 48C). The symbol recognition neural network is trained by neural network training module (block 46C).

After characters and vectors are identified in isolation, a context processing phase attempts to construct groups of objects, such as text strings from characters and composite symbols from vectors. Context processing improves recognition by considering groups of composite objects. For example, if a character string identifying a pump must follow a certain pattern, this fact may be used to change the classification of some ambiguously recognized character in a text string near a pump symbol. Context processing may also be used to reassign objects mistakenly called text, such as dashes constituting a hidden line or a small "o" that is part of a symbol.

It is well known that the context in which a character appears gives a great deal of information about the identity of that character. Although most studies of context are based upon the assumption that the characters to be recognized are part of a text with known statistical properties, the problem of CAD conversion is different. The amount of text in an engineering drawing which conforms to normal English prose is very small; most text is used to form part numbers, dimensions, or short notes.

In context processing, a single global data structure called a blackboard integrates all of the information about the drawing: vectors, text, symbols, and attributes. Blackboard architecture was originally developed and disclosed in the HEARSAY speech recognition project, as is known by those skilled in the art.

The blackboard of the present invention is organized as a series of levels, each containing drawing elements and other information generated by the recognition process. Each level is dedicated to performing a particular form of recognition. Each act of recognition generally aggregates several "lower" forms of drawing elements into a "higher" form which is then placed on a different level of the blackboard for further recognition. Higher levels of the blackboard thus work with more abstract drawing elements representing larger portions of the drawing. As the recognition progresses, drawing elements move through the levels of the blackboard, aggregating into larger, more abstract units, until it is no longer possible to combine them in meaningful ways.

The present invention preferably utilizes a number of blackboard levels including: (1) geometry, (2) polygon, (3) arrow, (4) text, (5) virtual geometry, (6) composite symbols, (7) associativity, (8) connectors, (9) metasymbols, and (10) junk. Applicants' believe that prior art character and symbol recognition blackboards employed only geometry and composite symbol levels.

Figure 8:
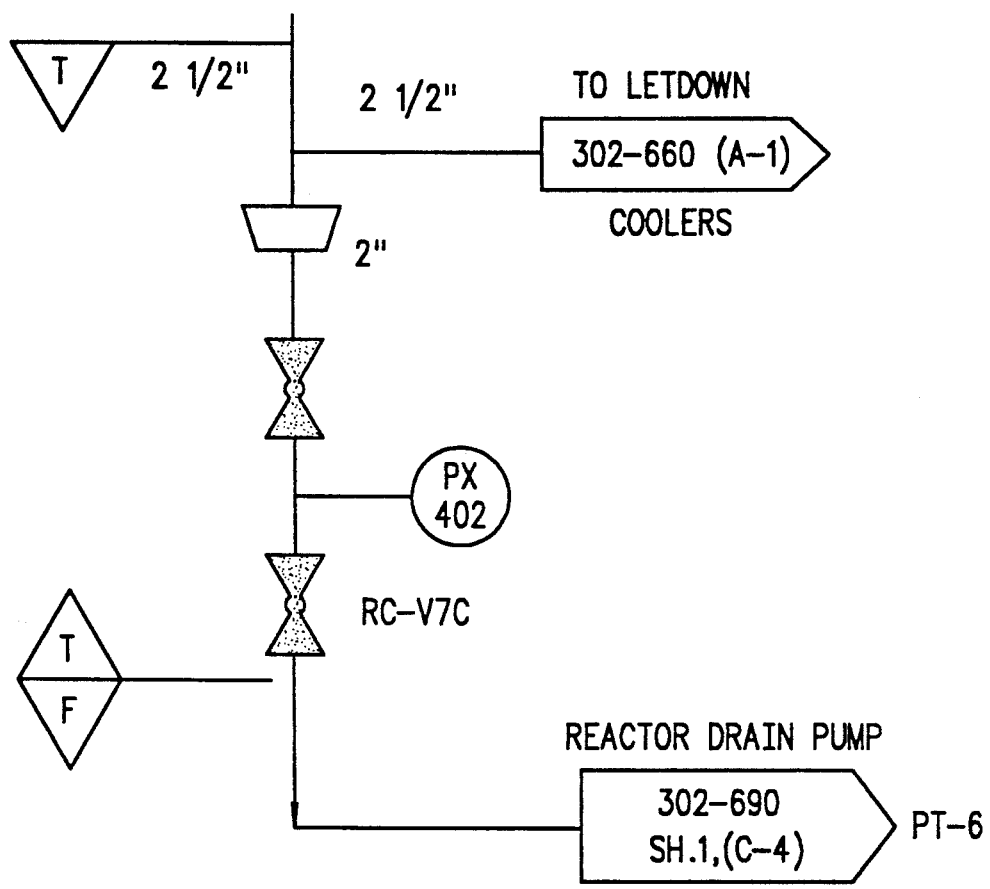
FIG. 8 is a sample drawing which is to be processed in accordance with the present invention.

The levels utilized in accordance with the present invention are more fully disclosed and comprehended in reference to an actual symbol recognition problem. Turning to FIG. 8, components of an engineering drawing are depicted. FIGS. 9-16 depict how the elements from this figure are initially deconstructed and then reconstructed in accordance with the invention. The figures also indicate what aspects of a drawing are processed at which level.

Figure 9:
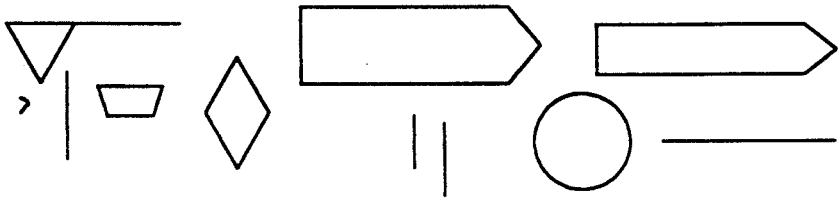
FIG. 9 depicts the blackboard of the present invention and the features it extracts from the drawing of FIG. 8 on its initial pass.
Figure 9:
Figure 9:
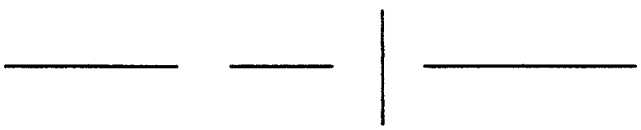

As depicted in FIG. 9, the blackboard 100 includes a geometry level 102. At the geometry level, unfilled polygons and simple symbols are accumulated. This is achieved by utilizing prior art symbol recognition techniques. More particularly, prior art rulebases, such as those disclosed in U.S. Pat. No. 4,949,388 may be used. As a result, and as depicted in FIG. 9, the unfilled polygons and simple symbols of FIG. 8 are identified at the geometry level 102.

At the polygon level 104, filled polygons, arrowheads, lines, and arcs are identified. Again, these items may be identified through rulebases which may be coded in accordance with prior art techniques. The filled polygons, arrowheads, lines, and arcs from FIG. 8 are identified at the polygon level 104, as seen in FIG. 9.

At the arrow level 106, arrowheads and their associated lines are identified through the use of rulebases. Thus, as seen in FIG. 10, the arrows within FIG. 8 are accumulated.

At the text level 108, blocks of text are built and vectorized characters are identified through the use of rulebases. As seen in FIG. 9, the text from FIG. 8 is identified at the text level 108.

At the virtual geometry level 110, broken text, sub-symbols, lines, and arcs are converted into non-broken symbols and characters. Again, rulebases may be formulated to fill in the missing data within the characters. As to be more fully described below, the symbols from the geometry level 102 are eventually passed to the virtual geometry level 110, as seen in FIG. 11, where discontinuities are filled in.

At the composite symbols level 112, isolated symbols are associated with immediately adjacent symbols. By way of example, the well-known diagrammatic symbol for an AND gate might be combined with an "o" at the composite level 112 to form the well-known diagrammatic symbol for a NAND gate. Rulebases to realize this combination are known in the art. The composite symbol level 112 is depicted in FIG. 12.

The connectivity level 114 identifies connections between symbols. The connectivity, or connector, level 114 is most fully appreciated with reference to FIG. 14. Many symbols represent functional units with input and output ports. Consequently, the input and output ports provide interconnection information which implicitly defines the interactions between the units or processes.

Figure 15:
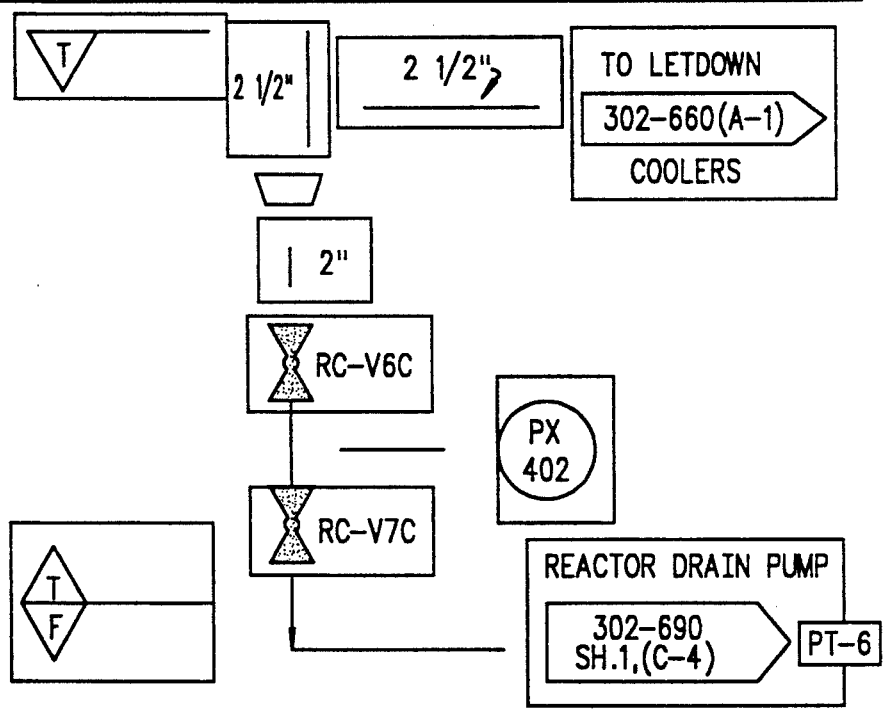
FIG. 15 depicts the blackboard of the present invention and the processing of elements during a seventh pass.

The associativity level 116 identifies meaningful relationships between text and symbols contained in the drawing. Thus, as seen in FIG. 15, individual components are boxed and associated with one another. The recognition process uses a rulebase to associate text with the appropriate symbol or symbols. The rules in the rulebase are predicated on the experience and knowledge of a person skilled in the interpretation of the relevant drawings. Frequently, the associativity of text and symbols can be resolved by proximity and context.

Figure 16:
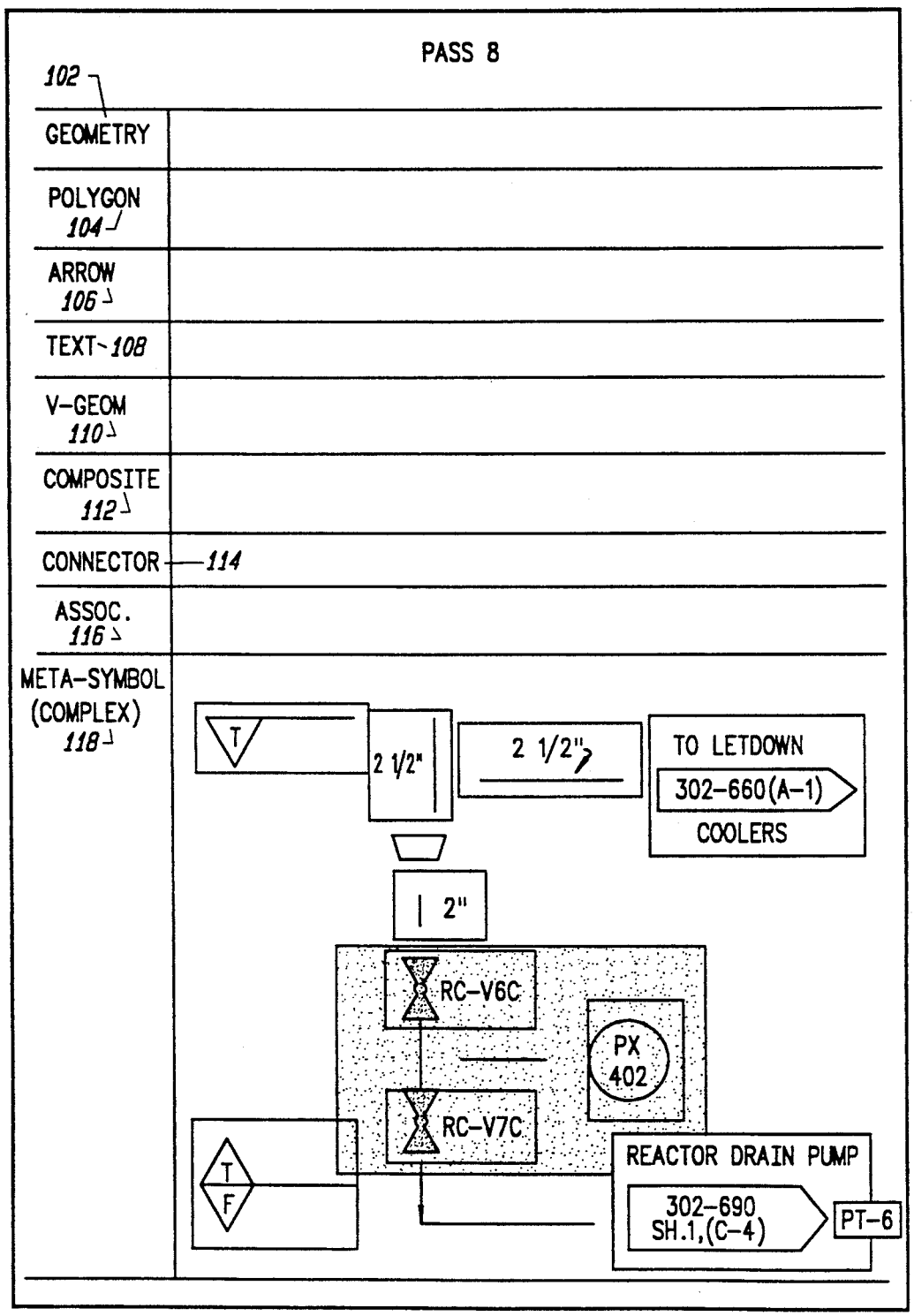
FIG. 16 depicts the blackboard of the present invention and the processing of elements during an eighth pass.

The meta-symbol level 118 represents a collection of symbols, connectors, and perhaps text representing a functional unit or process. Thus, as seen in FIG. 16, the shaded region represents a functional unit. This information is often implicit: a skilled interpreter instantly recognizes the assemblage as a single logical unit even though there is no explicit delineation or description of the unit on the drawing. Rulebases encode this knowledge and guide the automated recognition of the meta-symbols. This feature will be further discussed below.

Figure 7:
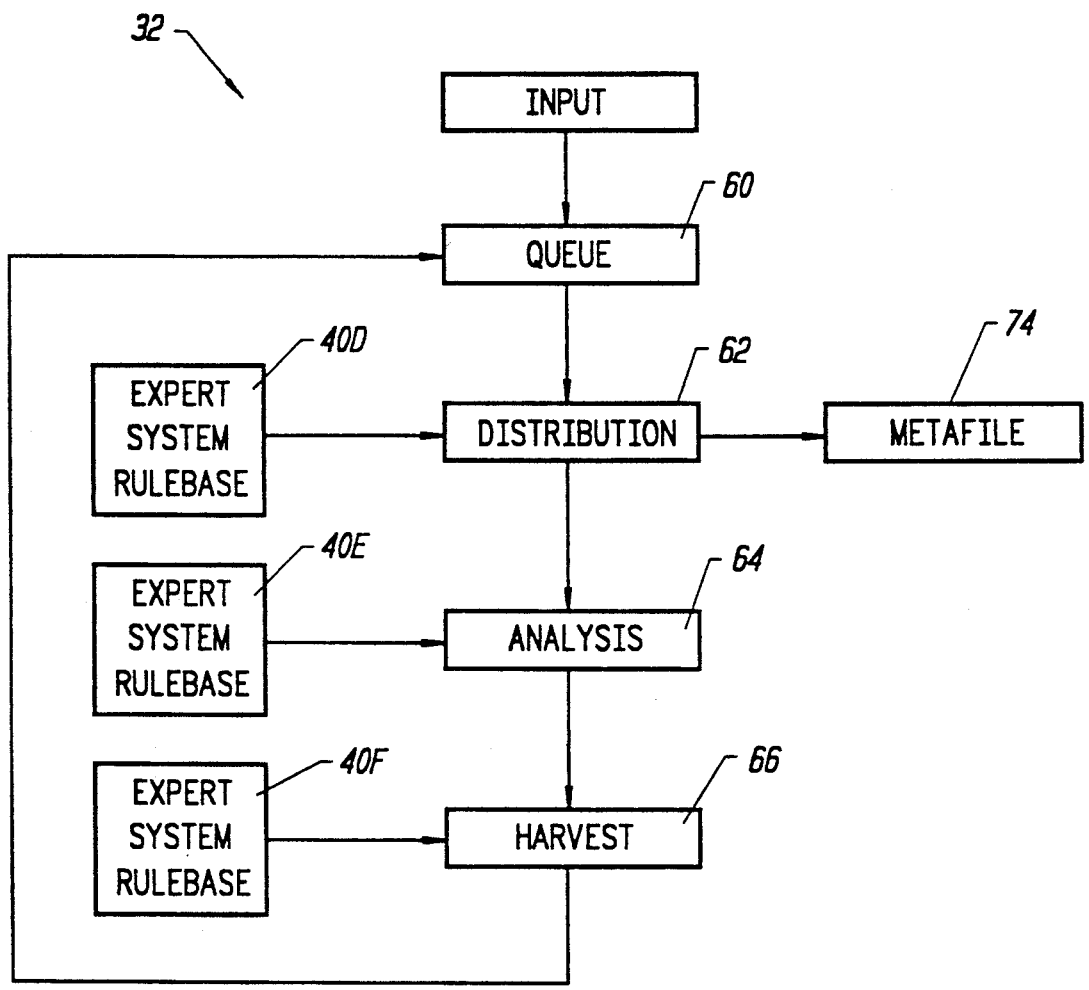
FIG. 7 is a block diagram depicting context processing through various blackboard levels of the recognition module.

Having disclosed the various levels of the blackboard of the present invention, progression through the blackboard will now be described. This will be done in relation to FIG. 7.

Associated with each level is a set of rulebases 68 implementing three basic operations: distribution (block 62), analysis (block 64), and harvesting (block 66). The blackboard alternates between distribution (block 62), analysis (block 64) and harvesting (block 66) phases, forming a structure that recirculates the drawing elements through the various blackboard levels.

The analysis phase (block 64) allows recognition to take place on each level. The analysis operation transforms the contents of a level producing new drawing elements that in general represent "recognized" collections of the original drawing elements. This operation generally combines existing elements into new elements. During analysis, levels do not interact. This policy permits concurrent processing of levels without having to deal with issues of resource locking and deadlock. Each level maintains information describing the status of the analysis which determines when that level is shut down. Analysis of a level can also be deferred until all levels below it are disabled. This technique is employed when the full context of an element is needed to properly recognize it. A level may produce elements that it also accepts, thereby recycling them.

Because a level's analysis is implemented by a rulebase, it is free to perform as many passes over the level's contents as it requires. These passes can be done in successive analysis phases, or they can be hidden inside a single analysis phase.

When a level accepts a proffered drawing element, the clustering operation of that level is invoked. This operation captures the relationships between elements recognized by the analysis operation.

In the distribution phase (block 66), drawing elements from the harvesting operation are proffered to a level in a fixed sequence, from "low" to "high", until some level decides to accept the element. Thus, several levels may be prepared to accept elements of a certain type, but the higher level's don't see them until the lower levels reject them (or are disabled). At some point in the recognition, a given level can no longer make useful contributions to the process, so it is withdrawn from further participation (disabled).

The decision to disable a level is made by the harvesting operation (block 66) defined for that level, and is generally based on the "yield" of the preceding analysis phase. When a level is disabled, all of the drawing elements on that level are redistributed by the distribution phase (block 62) to other levels. Disabling is permanent, so the decision to disable a level is often deferred until all the levels below it have been disabled, giving the level the maximum time to produce results.

The operation of the distribution, analysis, and harvesting steps is more fully described in relation to FIGS. 8-16. The analysis phase (block 64) is readily demonstrated. As previously discussed, in the analysis phase, identified elements are combined to form new elements. This process is disclosed in relation to FIGS. 13 and 14. In FIG. 13 the elements from the composite level 112 and the connector level 114 are unconnected. However, when the elements from the composite level 112 are passed to the connector level 114, the analysis operation combines these elements to form the elements depicted at the connector level 114 in FIG. 14.

Relying upon the same components, the distribution phase can be demonstrated. The elements from the composite level 112 are distributed to the connector level 114 where they are claimed; that is, they are connected with other drawings elements. Since the elements from the composite level 112 have been distributed, and there are no other elements on the lower levels, the composite level 112, like the lower levels, is disabled.

The blackboard 100 operation will now be more fully described by demonstrating its processing of the drawing elements of FIG. 8. Turning to FIG. 9, the first pass made by the blackboard 100 activates the geometry level 102, polygon level 104, text level 108, and connector level 114. The information from FIG. 8 is distributed at these various levels, as seen in FIG. 9.

During the second pass, as appreciated in reference to FIG. 10, the drawing elements from the geometry level 102 and polygon level 104 are harvested from those levels and distributed at different levels. For instance, the lines from the geometry level 102 are claimed at the arrow level 106. More particularly, the lines from the geometry level 102 are combined with the arrowheads from the polygon level to form arrows at the arrow level 106. The remaining unfilled polygons from the geometry level 102 are claimed at the text level 108. The remaining filled polygons from the polygon level 104 are claimed by the composite level 112.

During the third pass, additional progression through the blackboard is experienced, as seen in FIG. 11. The fully formed arrows from the arrow level 104 proceed through several levels before being claimed at the association level 116. The polygons originally claimed by the text level 108 are harvested and distributed to the virtual geometry level where they are claimed.

Turning now to FIG. 12, the remaining drawing elements from the text level 108 are harvested and distributed at the virtual geometry level 110 where they are claimed. The text level 108 is disabled.

Turning now to FIG. 13, the fifth pass over the data is realized. At this juncture, the virtual geometry level 110 has been harvested. The symbols from that level are claimed at the composite level 112 while the text from that level is claimed at the association level 116.

Figure 14:
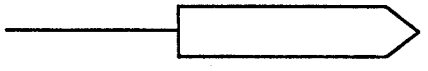
FIG. 14 depicts the blackboard of the present invention and the processing of elements during a sixth pass.

In the sixth pass, as detailed in FIG. 14, the elements from the composite level 112 are harvested and distributed to the connector level 114. Through the analysis phase, the symbols are attached to their connectors. This analysis step is largely based on positional information associated with each symbol. That is, each symbol (and character) has an associated (x,y) location. Symbols are combined when the differences in their (x,y) locations are within some small delta value. The exact location for combining the elements is determined through rulebases. For instance, valves are connected to pipes at their ends, not on their sides. Another result from this pass is that the arrows at the association level 116 are linked with their identifying information.

In the seventh pass, associated with this example and depicted in FIG. 15, the connector level 114 elements are harvested and distributed to the associative level 116. Through the analysis phase, text is associated with the symbols. The symbols are identified and blocked as individual components.

Finally, in an eighth pass, the metasymbol level may be invoked to identify groups of individual components which may be associated as logical units. (logical units, and combinations of logical units to be identified as components) For instance, as seen in FIG. 16, the shaded region corresponds to a number of components which may be recognized as operating together as a logic unit.

Thus, in accordance with the associativity level 116 and the meta-symbol level 118, logical units can be combined with other logical units to identify sub-systems. Sub-systems can be combined with other subsystems to identify systems. These combinations are realized through rulebases which possess practical and expert knowledge regarding the combination of engineering elements. This method of combining elements also enables improved confidence within the character and symbol recognition process. That is, a rulebase can be developed wherein the proximity of a valve to a pump improves the confidence that a valve and a pump have actually been identified. In contrast, if through combination, a valve is coupled to a resistor, the system will be able to identify a probable misrecognition of an element. Expanding upon this concept, in accordance with the invention, the associativity and meta-symbol levels enable verification of operative systems. For example, rulebases can be provided to insure that any identified circuit is a closed loop. Therefore, the blackboard of the present invention is unique in that it does not simply put elements together, rather, it puts them together so that they may be analyzed in a useful manner.

Any unused or unidentified characters or symbols are preferably harvested and distributed to a residual or junk level. The elements at the junk level may be interactively presented to a user to associate them with identified elements.

Returning to FIG. 1, the results from the recognition module 14 are compiled in a metafile. The metafile may contain drawing geometry, a description of non-geometric information, and descriptions of the relations between elements of each type.

The metafile is conveyed to the modification module 16. In accordance with prior art techniques, a CAD drawing editor is utilized to clean and verify the accuracy of the conversion. D-CAD, a commercially available CAD editor sold by GTX Corporation, Phoenix, Ariz., may be used in accordance with the invention.

The CAD editor preferably provides special verification functions. For example, it should automatically find characters recognized with low confidence and present them one at a time to the operator for identification. Further, the CAD editor preferably allows the operator to superimpose the converted data on the original raster image, thereby providing a method for verifying the accuracy of the conversion at a glance.

The translator 18 receives the modified metafile from the modification module 16 and converts it to a format compatible with the specific target CAD system 20 to produce an output file that is ready to be loaded into that system. The translator 18 also produces an output file that may be conveyed to database 22.

For example, in relation to the valves of FIG. 8, the string of characters and numerals indicating the valves' equipment tag numbers (RC-V6C, RC-V7C) are stored. The representations of the symbol and text are stored in the CAD system 20, while the tag numbers, valve locations and connectivity information are stored in the data base 22.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of recognizing written items including characters and symbols, comprising the steps of:
feeding said items to rulebases for recognition;
processing selected features of items which are not recognized during said feeding step; and
conveying said selected features corresponding to said items which are not recognized during said feeding step to neural networks for recognition.

2. The method of claim 1 further comprising the step of:
delivering said items to a context a blackboard with a plurality of ascending levels.

3. The method of claim 2 wherein said delivering step includes the steps of:
(A) analyzing items on a level;
(B) harvesting items on said level after said analyzing step;
(C) distributing items on a higher level after said harvesting step; and
(D) repeating steps (A) through (C) for a plurality of ascending levels.

4. A method of recognizing written items including characters and symbols, comprising the steps of:

(A) processing said characters, said character processing including:
(1) recognizing fully formed characters by:
(a) transmitting characters to a full character recognition rulebase, said full character recognition rulebase yielding identified characters and unidentified characters;
(b) conveying said unidentified characters to full character neural networks;
(2) isolating broken characters and recognizing them by:
(a) conveying said broken characters to broken character neural networks;
(B) processing said symbols, said symbol processing including:
(1) transmitting said symbols to a symbol recognition rulebase, said symbol recognition rulebase yielding identified symbols and unidentified symbols;
(2) conveying said unidentified symbols to symbol recognition neural networks; and
(C) context processing said characters and symbols, said context processing including the use of a multilevel blackboard with a plurality of ascending levels, said blackboard combining characters and symbols into logical units and further serving to verify the recognition of said characters and symbols.

5. The method of claim 4 wherein said character processing step further includes the steps of:
vectorizing said unidentified characters to form vectorized characters; and
extracting features from said vectorized characters to form extracted features and feeding said extracted features to said full character neural networks.

6. The method of claim 5 wherein said extracted features include:
the x-coordinate of the centroid of the end-points of all vectors making up the boundary of said unidentified character; and
the y-coordinate of the centroid of the end-points of all vectors making up the boundary of said unidentified character.

7. The method of claim 5 wherein said extracted features include:
the total slantiness of said unidentified character;
the mean slope of said unidentified character; and
the total angle of said unidentified character.

8. The method of claim 4 wherein said character processing step further includes the step of:
enhancing features of said broken characters prior to conveying said characters to said broken character neural networks, said enhancing step including the steps of scale rastering said broken characters and applying regionalized convolution masks to said broken characters.

9. The method of claim 4 wherein said symbol processing step further includes the steps of:
vectorizing said symbols;
enhancing features of said symbols prior to conveying said symbols to said symbol recognition neural networks, said enhancing step including the steps of scale rastering said symbols and applying regionalized convolution masks to said symbols.

10. The method of claim 4 wherein said context processing step includes the steps of:
(A) analyzing items on a level of said blackboard;
(B) harvesting items on said level after said analyzing step;

(C) distributing items on a higher level of said blackboard after said harvesting step; and (D) repeating steps (A) through (C) for a plurality of ascending levels of said blackboard.

11. The method of claim 4 wherein said context processing is utilized to move said characters and said symbols through said ascending levels of said blackboard, said characters and said symbols moving through a connector level.

12. The method of claim 4 wherein said context processing is utilized to move said characters and said symbols through said ascending levels of said blackboard, said characters and said symbols moving through an associativity level.

13. The method of claim 4 wherein said context processing is utilized to move said characters and said symbols through said ascending levels of said blackboard, said characters and said symbols moving through a geometry level.

14. The method of claim 4 wherein said context processing is utilized to move said characters and said symbols through said ascending levels of said blackboard, said characters and said symbols moving through a polygon level.

15. The method of claim 4 wherein said context processing is utilized to move said characters and said symbols through said ascending levels of said blackboard, said characters and said symbols moving through an arrow level.

16. The method of claim 4 wherein said context processing is utilized to move said characters and said symbols through said ascending levels of said blackboard, said characters and said symbols moving through a text level.

17. The method of claim 4 wherein said context processing is utilized to move said characters and said symbols through said ascending levels of said blackboard, said characters and said symbols moving through a virtual geometry level.

18. The method of claim 4 wherein said context processing is utilized to move said characters and said symbols through said ascending levels of said blackboard, said characters and said symbols moving through a composite level.

19. The method of claim 4 wherein said context processing is utilized to move said characters and said symbols through said ascending levels of said blackboard, said characters and said symbols moving through a meta-symbol level.

20. The method of claim 4 wherein said context processing is utilized to move said characters and said symbols through said ascending levels of said blackboard, said characters and said symbols moving through a junk level.

21. A method of recognizing written items including characters and symbols, comprising the steps of:
   (A) classifying said items as either characters or symbols;
   (B) processing said characters, said character processing including:
      (1) recognizing fully formed characters by:
         (a) transmitting said characters to a full character recognition rulebase, said full character recognition rulebase yielding identified characters and unidentified characters;
         (b) vectorizing said unidentified characters to form vectorized characters;
         (c) extracting features from said vectorized characters to form extracted features;
         (d) conveying said extracted features to full character neural networks;
      (2) isolating broken characters;
         (a) enhancing the features of said broken characters to form enhanced broken characters;
         (b) conveying said enhanced broken characters to broken character neural networks;
   (C) processing said symbols, said symbol processing including:
      (1) transmitting said symbols to a symbol recognition rulebase, said symbol recognition rulebase yielding identified symbols and unidentified symbols;
      (2) enhancing the features of said unidentified symbols to form enhanced symbols;
      (3) conveying said enhanced symbols to symbol recognition neural networks; and
   (D) context processing said characters and symbols, said context processing including the use of a multi-level blackboard with a plurality of ascending levels, said blackboard combining characters and symbols into logical units and further serving to verify the recognition of said characters and symbols.

22. The method of claim 21 wherein said extracted features include:
   the x-coordinate of the centroid of the end-points of all vectors making up the boundary of said unidentified character; and
   the y-coordinate of the centroid of the end-points of all vectors making up the boundary of said unidentified character.

23. The method of claim 21 wherein said extracted features include:
   the total slantiness of said unidentified character;
   the mean slope of said unidentified character; and
   the total angle of said unidentified character.

24. The method of claim 21 wherein said broken character enhancing step includes the steps of scale rastering said broken characters and applying regionalized convolution masks to said broken characters.

25. The method of claim 21 wherein said symbol enhancing step includes the steps of scale rastering said symbols and applying regionalized convolution masks to said symbols.

26. The method of claim 21 wherein said context processing step includes the steps of:
   (A) analyzing items on a level of said blackboard;
   (B) harvesting items on said level after said analyzing step;
   (C) distributing items on a higher level of said blackboard after said harvesting step; and
   (D) repeating steps (A) through (C) for a plurality of ascending levels of said blackboard.

27. The method of claim 26 wherein said context processing is utilized to move said items through said ascending levels of said blackboard, said context processing moving said items through a connector level and an associativity level.

28. The method of claim 26 wherein said context processing is utilized to move said items through said ascending levels of said blackboard, said context processing moving said items through a geometry level, an arrow level, a text level, and a meta-symbol level.

29. The method of claim 26 wherein said context processing is utilized to move said items through said ascending levels of said blackboard, said context processing moving said items through a polygon level, a virtual geometry level, and a composite level.

30. An apparatus for recognizing written items including characters and symbols, comprising:
(A) a scanner for scanning said characters and symbols;
(B) a recognition module, said recognition module including:
  (1) means for processing said characters, said character processing means including:
    (a) means for recognizing fully formed characters by:
      (i) means for transmitting said fully formed characters to a full character recognition rulebase, said full character recognition rulebase yielding identified characters and unidentified characters;
      (ii) means for conveying said unidentified characters to full character neural networks;
    (b) means for isolating and recognizing broken characters, said means including:
      (i) means for conveying said broken characters to broken character neural networks;
  (2) means for processing said symbols, said symbol processing means including:
    (a) means for transmitting said symbols to a symbol recognition rulebase, said symbol recognition rulebase yielding identified symbols and unidentified symbols;
    (b) means for conveying said unidentified symbols to symbol recognition neural networks;
  (3) means for context processing said characters and symbols, said context processing including the use of a multilevel blackboard with a plurality of ascending levels, said blackboard combining characters and symbols into logical units and further serving to verify the recognition of said characters and symbols;
(C) a modification module including graphics editing software to edit said scanned characters and symbols; and
(D) a translator to convert said scanned characters and symbols to a format suitable for a CAD system or data base.

31. The apparatus of claim 30 wherein said character processing means includes:
means for vectorizing said unidentified characters to form vectorized characters; and
means for extracting features from said vectorized characters to form extracted features and means for feeding said extracted features to said full character neural networks.

32. The apparatus of claim 30 wherein said character processing means further include:
means for enhancing features of said broken characters prior to conveying said characters to said broken character neural networks, said enhancing means including means for scale rastering said broken character and means for applying regionalized convolution masks to said broken character.

33. The apparatus of claim 30 wherein said symbol processing means further includes:
means for vectorizing said symbols; and
means for enhancing features of said symbols prior to conveying said symbols to said symbol recognition neural networks, said enhancing means including means for scale rastering said symbol and means for applying regionalized convolution masks to said symbol.

34. The apparatus of claim 30 wherein said means for context processing includes:
(A) means for analyzing items on a level of said blackboard;
(B) means for harvesting items on said level;
(C) means for distributing items on a higher level of said blackboard after said harvesting step; and
(D) means for invoking said analyzing means, said harvesting means, and said distributing means for a plurality of ascending levels of said blackboard.

35. The apparatus of claim 34 wherein said context processing means is utilized to move said characters and said symbols through said ascending levels of said blackboard, said characters and said symbols moving through a connector level and an associativity level.

36. The apparatus of claim 34 wherein said context processing means is utilized to move said characters and said symbols through said ascending levels of said blackboard, said characters and said symbols moving through a geometry level, an arrow level, a text level, and a metasymbol level.

37. The apparatus of claim 34 wherein said context processing means is utilized to move said characters and said symbols through said ascending levels of said blackboard, said characters and said symbols moving through a polygon level, a virtual geometry level, and a composite level.

* * * * *